United States Patent

[11] 3,564,266

[72] Inventor Theodore H. Klotz, Jr.
Scotia, N.Y.
[21] Appl. No. 719,528
[22] Filed Apr. 8, 1968
[45] Patented Feb. 16, 1971
[73] Assignee General Electric Company
a corporation of New York

[54] PHOTOELECTRIC FINGERPRINT RIDGE COUNTER
10 Claims, 7 Drawing Figs.

[52] U.S. Cl. .......... 250/219, 250/234, 283/7, 340/146.3
[51] Int. Cl. .......... G01n 21/30
[50] Field of Search .......... 250/219Icr, 234, 219Id; 340/146.3 (Fingerprint)

[56] References Cited

UNITED STATES PATENTS

| | | | |
|---|---|---|---|
| 3,200,701 | 8/1965 | White | 340/146.3 |
| 3,403,263 | 9/1968 | Hargens, III | 250/202 |
| 3,238,501 | 3/1966 | Mak et al. | 340/146.3 |
| 3,419,287 | 12/1968 | Rudic | 283/7 |

FOREIGN PATENTS

| | | | |
|---|---|---|---|
| 150,305 | 12/1962 | Russia | 340-146.3 |

OTHER REFERENCES

Claassen and McLaughlin, " Fingertip Brienting and Ridge Viewing Apparatus," IBM Technical Disclosure Bulletin, Vol. 8, No. 3, August 1965, P. 435

The Science of Fingerprints, Federal Bureau of Investigation

*Primary Examiner*—Archie R. Borchelt
*Assistant Examiner*—C. M. Leedom
*Attorneys*—Richard R. Brainard, Marvin Snyder, Paul A. Frank, Frank L. Neuhauser, Oscar B. Waddell and Melvin M. Goldenberg

ABSTRACT: Counting of ridges between the central core and the delta of a fingerprint as an identification aid is accomplished by moving a photodetector between a pair of selected points across a rear-projected image of the print. The photodetector output signal drives a counter for each crossing of the photodetector light intensity reference level in a given direction, so as to indicate the number of ridges. Photodetector-positioning apparatus is provided to reduce operator fatigue and insure accuracy.

Inventor:
Theodore H. Klotz Jr.,
by Marvin Snyder
His Attorney.

Inventor:
Theodore H. Klotz Jr.,
by Marvin Snyder
His Attorney.

Inventor:
Theodore M. Klotz Jr.,
by Marvin Snyder
His Attorney.

PHOTOELECTRIC FINGERPRINT RIDGE COUNTER

This invention relates to fingerprint identification, and more particularly to a method and apparatus for classifying fingerprints to a high degree of accuracy.

Many law enforcement agencies today utilize the so-called henry system of fingerprint classification for identifying persons according to their fingerprints. This system involves a formula of classification including a primary category in which the set of fingerprints of an individual is assigned a fractional value representing a predetermined weighting to identify those fingerprints having plain whorl and composite patterns. A secondary fractional category is also assigned to identify the patterns in the right and left index fingers.

As a subsecondary category to further aid in the henry system of classification, a number of symbols are obtained based upon the number of fingerprint ridges contained in the index, middle, ring and little fingers of both hands. The number of these ridges is obtained by counting, usually with aid of a reticle, the number of ridge lines appearing between the delta and core of the fingerprint. In making this count, great care must be taken in order to insure accuracy; hence, the task of making such count is very exacting and tedious. This is especially true where a large number of fingerprints must be classified, as is the case in law enforcement agencies for example. Not only is this procedure very time consuming, but operator fatigue may easily result in errors in counting. Accordingly, the present invention is concerned with obtaining the subsecondary henry fingerprint classification by facilitating accurate counting of ridge lines between the delta and core of a fingerprint at a high rate of speed with photoelectric apparatus.

Accordingly, one object of the invention is to provide a photoelectric system for obtaining, without need of a reticle, data from fingerprints essential to the henry system of fingerprint classification.

Another object is to provide a method and apparatus for rapidly obtaining accurate classification date from fingerprints.

Another object is to provide apparatus for automatically counting and recording the number of ridges between the delta and core of a fingerprint.

Briefly, in accordance with a preferred embodiment of the invention, apparatus for detecting the number of ridges between the core and the delta of a fingerprint is provided. This apparatus comprises a translucent optical projection screen, means for optically projecting fingerprint images onto the surface of one side of the screen, and photodetector means situated on the opposite side of the translucent screen and controllably positionable over the surface of the opposite side of the screen so as to respond to large changes of illumination intensity corresponding to ridges of the fingerprint. Counter means are coupled to the photodetector means for the purpose of registering counts in accordance with the number of ridges detected between the delta and core of the projected print as the photodetector is moved in substantially a straight line therebetween.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
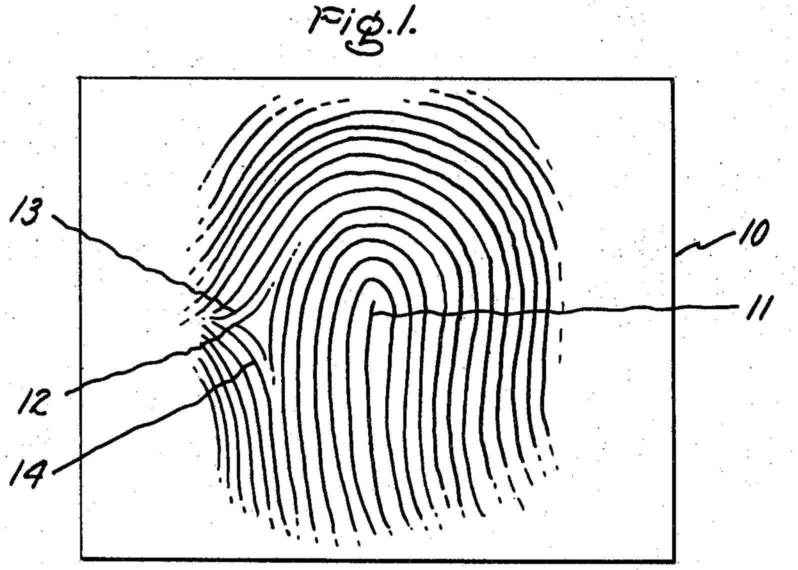
FIG. 1 illustrates an image of the fingerprint, showing typical core and delta regions as defined by the ridges of the print.

In FIG. 1, a projected image of a fingerprint is illustrated as it appears on a screen 10. The fingerprint contains a core 11, which may be defined as the focal point, on inner terminus of the fingerprint, and a delta 12, or outer terminus of the print. As is well known in the art of fingerprint classification, correct location of the core and delta is essential in order to achieve proper fingerprint classification. The exact location of the delta is considered to be the ridge intersection or fragment at or closest to the center of the divergence of the two type-lines. The type-lines may be defined as the innermost ridges that bound the pattern area, since these are the ridges that run parallel and then diverge and surround the pattern area, or area of the fingerprint in which are included the characteristics that determine its pattern type. Thus, in FIG. 1, the ridges designated 13 and 14 comprise the type-lines of the fingerprint.

Figure 2:
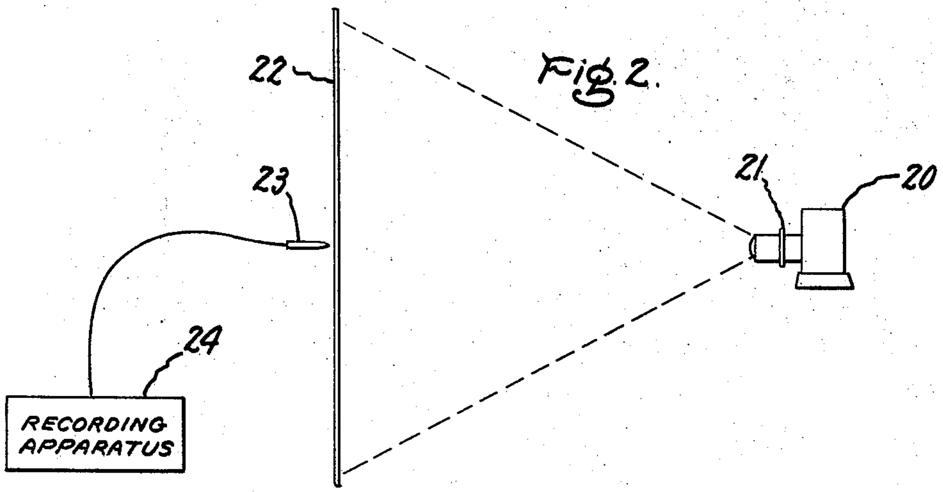
FIG. 2 is a schematic diagram of the apparatus of the invention, showing the relative placement of the fingerprint projection apparatus and the photoelectric ridge detection apparatus.

FIG. 2 illustrates apparatus in general for practicing the instant invention. Thus, a projector 20 containing a fingerprint transparency 21 situated therein projects the image of the fingerprint onto the rear of a translucent screen 22. Projector 20, in the alternative, may comprise an opaque image projector capable of projecting images from original, opaque fingerprint cards.

On the side of screen 22 opposite projector 20, which constitutes the viewing side, a photodetector device or light pen 23 may be moved across the surface of screen 22 in order to detect changes in illumination intensity exceeding a predetermined amount. Output signals from photodetector device 23 are connected to recording apparatus 24 which includes a ridge counter. Thus, when a fingerprint image is rear-projected onto screen 22, movement of photodetector device 23 across the viewing surface of screen 22 causes detection of the dark ridges on the screen. For accurate readings, the width of the photosensitive surface of light pen 23 must be as small as possible, preferably smaller than the width of the projected ridges, and shielded from external light. Conveniently, a Texas Instruments type 403 silicon photodetector may be mounted within a cylindrical enclosure about the size of the barrel of a ballpoint pen in order to provide the desired pickup.

Figure 3:
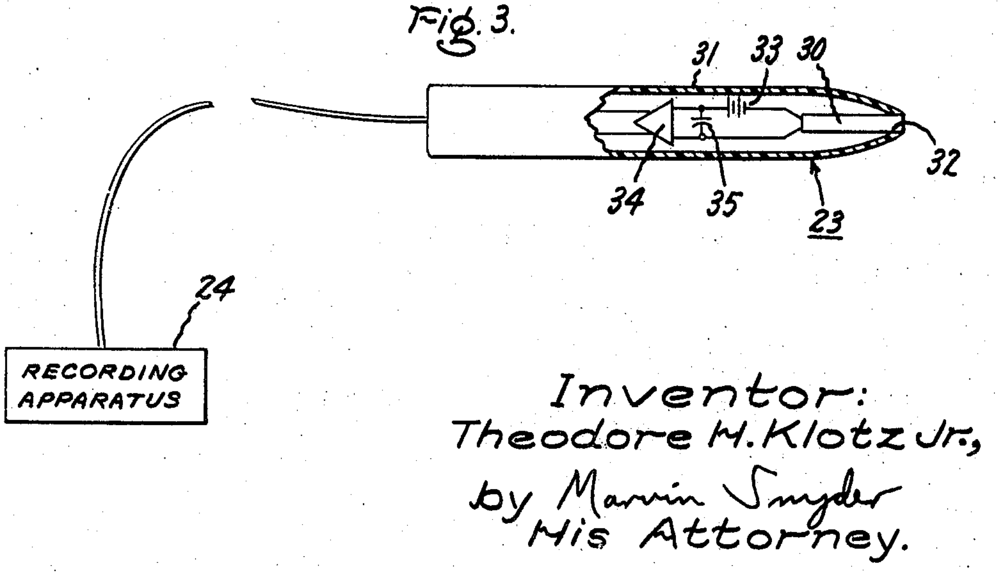
FIG. 3 is a schematic diagram of circuitry employed in the instant invention, showing its overall relationship to the system.

In FIG. 3, a circuit diagram for operating the photodetector apparatus is illustrated. Thus, light pen 23 is shown to comprise a photodetector 30 mounted within a hollow, cylindrical shaped structure 31, having an opening at one end 32 thereof in order to admit light to the photodetector. Photodetector 30 is connected in series with a source of DC bias 33 and the input terminals of a preamplifier 34 having an input impedance in the order of 1 megohm. Sensitivity of photodetector 30 is established by selecting a threshold or desired amplitude of voltage for operating recording apparatus 24, so that the system is rendered insensitive to small, and thus insignificant, changes in illumination intensity. The input terminals to preamplifier 34 are shunted with a capacitor 35 in order to sufficiently limit high frequency response and minimize effects of noise due to random variation in fingerprint density and possible 60 cycle AC pickup. Capacitor 35 has substantially no effect upon the count recorded by recording apparatus 24 connected to the output of preamplifier 34, since the rate at which ridges are counted is considerably lower than noise frequency or the 60-cycle frequency of alternating current. Conveniently, power supply 33, capacitor 35 and preamplifier 34 may all be fitted into cylindrical structure 31, as indicated in FIG. 3.

Figure 4:
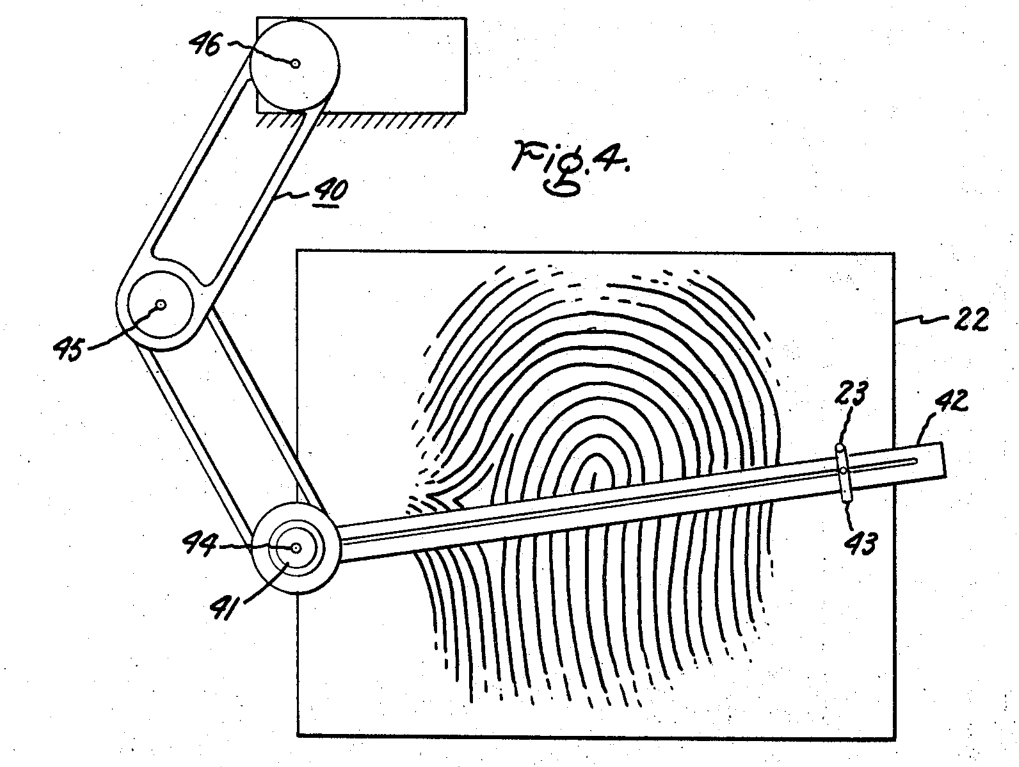
FIG. 4 is a plan view of apparatus to assist in manually obtaining accurate ridge counts along a straight line between the core and delta of a fingerprint.

FIG. 4 illustrates, in plan view, apparatus for accurately guiding the movement of photodetector device 23 in a straight line across the viewing surface of screen 22 so as to obtain an accurate count of ridges between the core and delta of a fingerprint image displayed on screen 22. This apparatus basically comprises a device 40, similar to a drafting machine, having a knob 41 which establishes a setting for a guide rail 42 at a predetermined angle with the horizontal, and being positionable by virtue of being pivoted at points 44, 45 and 46. A slide mechanism 43, to which photodetector device 23 is affixed, may then be moved across guide rail 42 in a straight line at an angle determined by the setting of knob 41, and at a vertical elevation determined by the positioning of device 40 about pivot points 45 and 46. Thus, as light pen 23 is moved across the ridges of the fingerprint image, the ridges are detected and recorded in recording apparatus 24, shown in FIGS. 2 and 3.

Figure 5:
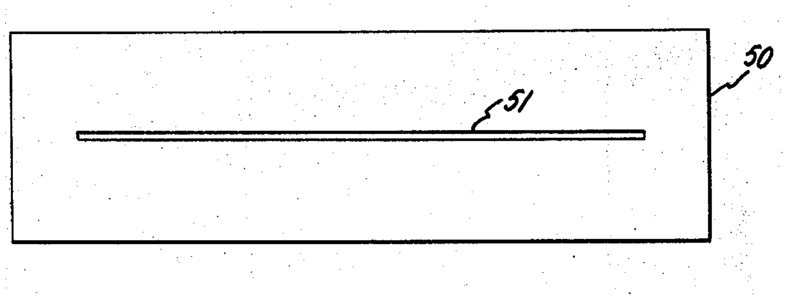
FIG. 5 illustrates a typical mask which may be placed between the projector screen and the photodetector to improve accuracy of ridge counts between the core and delta of a projected fingerprint image.

FIG. 5 illustrates an opaque mask 50 having a slot 51 cut along a straight line therein. By use of mask 50, light pen 23 may be moved along slot 51, which is aligned between the core and delta of the fingerprint, so as to detect all ridges extant between the core and delta of the print. Mask 50 may be held against the screen either manually or with mechanical clamps. Conveniently, the open end of cylinder 31 of the light pen has an outer diameter which fits slidably within slot 51. This obviates any sideward movement of the light pen as it is moved along the slot, which might otherwise result in an erroneous ridge count.

Figure 6:
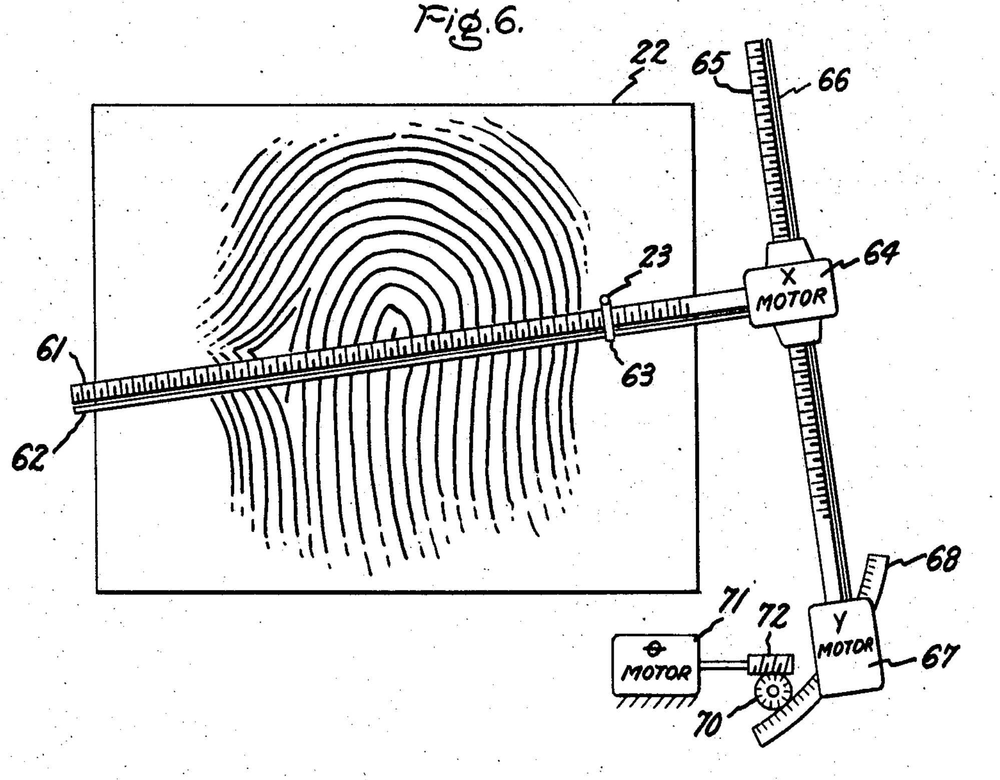
FIG. 6 is a plan view of apparatus for electromechanically obtaining accurate ridge counts along a straight line between the core and delta of a fingerprint.

FIG. 6 is a plan view of screen 22 showing apparatus for electromechanically positioning light pen 23 along the displayed fingerprint image and for moving the light pen in a straight line between the core and delta of the fingerprint image. This apparatus comprises a screw 61 and a guide rod 62 for respectively moving and supporting in a desired position a carriage 63 for light pen 23. Screw 61 is revolved by an X position motor 64 which itself is moved and supported in a desired position by a screw 65 and guide rod 66, respectively. Screw 65 is driven by a Y position motor 67 which is mounted on a curved rack gear 68. Rack gear 68 is driven by a pinion gear 70 from an angular or 0 position motor 71 through a worm gear 72. Thus, light pen 23 has 3° of freedom in displacement over the viewing surface of screen 22 and, once 0 position motor 71 and Y position motor 67 have situated screw 61 and guide rod 62 along a straight line between the core and the delta of the displayed fingerprint image, X position motor 64 revolves screw 61 so as to move light pen 23 between the core and delta of the fingerprint. Control of motors 64, 67 and 71 may be achieved by electronic motor positioning apparatus (not shown) coupled thereto. In such case, the output of photodetector device 23 is connected to fingerprint ridge-counting apparatus through a switch which is activated only after photodetector device 23 has been positioned at either the core or delta of the print preparatory to being driven to the other location on the print by operation of X position motor 64.

Figure 7:
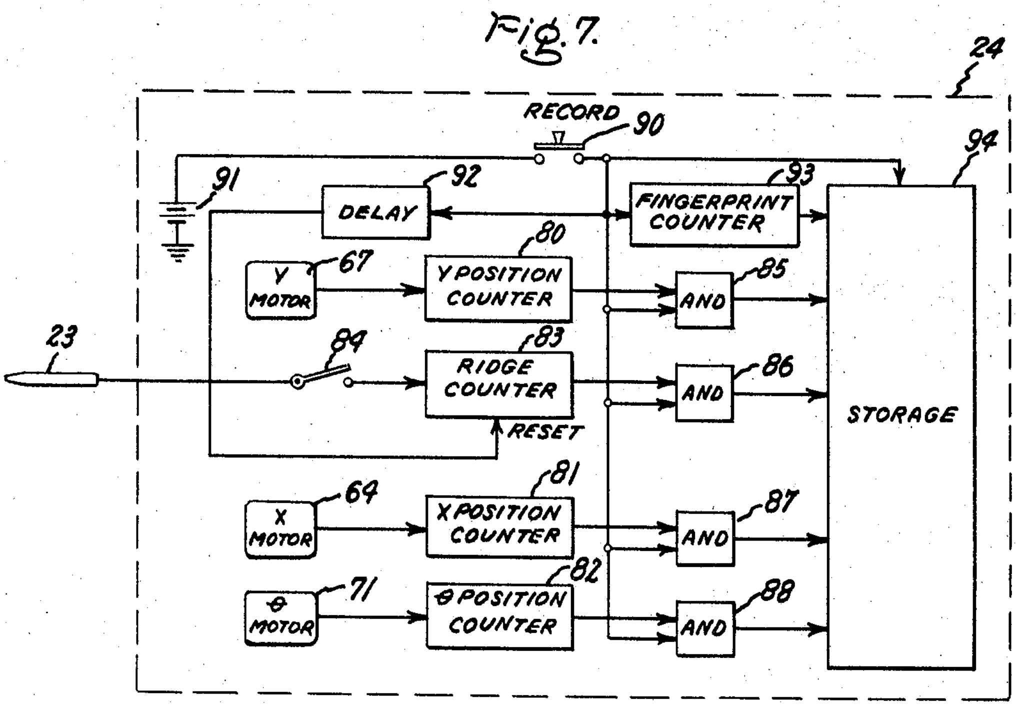
FIG. 7 is a block diagram of recording apparatus capable of registering data representing ridge counts between the core and delta of a fingerprint together with location data regarding the line between the core and delta of the fingerprint.

FIG. 7 is a block diagram of recording apparatus 24 capable of registering data regarding ridge counts supplied by photodetector device 23 and, if desired, the positions of X motor 64, Y motor 67 and 0 motor 71 extant upon completion of a fingerprint ridge count. Thus, a Y position counter 80, an X position counter 81 and a 0 position counter 82 are connected, respectively, to Y motor 67, X motor 64 and 0 motor 71 for the purpose of counting each revolution or predetermined fractional revolution of the respective motors. In addition, a fingerprint ridge counter 83 is connected to the output of light pen 23 through a switch 84. Ridge counter 83 preferably has an adjustable input signal threshold level, so that spurious noise pulses which are below this level do not actuate the counter.

Output signals from counters 80, 83, 81 and 82 are furnished to one input of each of a plurality of two-input AND gates 85, 86, 87 and 88, respectively. The second input to each of AND gates 85, 86, 87 and 88 is furnished in common through a normally open RECORD pushbutton 90 from a power supply 91. Pushbutton 90 also furnishes an input signal to a delay circuit 92, which resets ridge counter 83 after a predetermined delay, and to a fingerprint counter 93, so as to advance the count therein by one each time the pushbutton is depressed. Output signals from AND gates 85, 86, 87 and 88, as well as from fingerprint counter 93, are furnished to storage apparatus 94, which may comprise any well-known recording means such as magnetic tape, for example. Recording by storage means 64 is initiated upon actuation of RECORD pushbutton 90, which is coupled thereto.

In operation, therefore, readout of the number of ridges between the core and delta of an imaged fingerprint is begun by positioning motors 67 and 71 so that a straight-lined path between the core and delta of the print can be traversed by light pen 23. The light pen is next positioned by motor 64 at either the core or the delta, preparatory to counting ridges therebetween. At this time, switch 84 is closed, and X motor 64 is actuated so as to start photodetector device 23 on its journey between the core and delta of the print. As X motor 64 drives light pen 23, ridge counter 83 counts ridges encountered by the light pen along its way, starting from zero. In addition, the count in X position counter 81 changes as X motor 64 continues to move.

When photodetector device 23 reaches its destination in the fingerprint image, X motor 64 is deenergized, so that X position counter 81 retains the count corresponding to the final X position of photodetector apparatus 23. At the same time, a count which corresponds to the number of ridges situated along the path traversed by light pen 23 between the core and delta of the fingerprint is stored in ridge counter 83. At this time, the operator of the fingerprint ridge-counting apparatus depresses RECORD pushbutton 90, fulfilling the first input to each of AND gates 85, 86, 87 and 88 so as to transfer the counts in counters 80, 83, 81 and 82, respectively, into storage means 94. Concurrently, the count in fingerprint counter 93 is increased by one. Energization of storage means 94 directly from RECORD pushbutton 90 conditions storage means 94 to accept the counts from counters 93, 80, 83, 81 and 82. Counter 93, therefore, serves the purpose of correlating each of the recorded counts with a particular fingerprint image. After a brief delay, delay circuit 92 resets ridge counter 83 to zero. Switch 84 is then opened and motors 67, 64 and 71 are positioned in preparation for light pen 23 to detect the ridges between the core and delta of the next projected fingerprint image.

The foregoing describes a photoelectric system for obtaining, without need of a reticle, data from fingerprints essential to the henry system of fingerprint classification. The system facilitates obtaining fingerprint classification data from fingerprints rapidly and accurately, and includes apparatus for automatically counting and recording the number of ridges between the core and delta of a fingerprint.

While only certain preferred features of the invention have shown by way of illustration, many modifications and changes will occur to those skilled in the art. It is, therefore, to be understood that the appended claims are intended to cover all such modifications and changes as fall within the true spirit and scope of the invention.

I claim:

1. Apparatus for detecting the number of ridges between the core and the delta of a fingerprint comprising:

a translucent projection screen;

means for projecting fingerprint images onto the surface of one side of said screen;

photodetector means situated on the opposite side of said translucent projection screen; and carriage means for holding said photodetector means and for moving the photodetector means in an orthogonal coordinate system, said carriage means being rotatable so that the photodetector means can be moved along a line connecting the core and the delta of the projected fingerprint image whereby said photodetector means can respond to large changes of illumination intensity corresponding to ridges of the fingerprint by producing an electrical signal related to the changes in illumination intensity.

2. Apparatus as set forth in claim 1 wherein said line forms one axis of said orthogonal coordinate system and wherein said carriage means comprises a cantilever mounted, sectioned arm comprising at least two sections moveable relative to one another, having a free end, the endmost section of which carries said photodetector means along its length.

3. Apparatus as set forth in claim 1 wherein said line forms one axis of said orthogonal coordinate system and wherein said carriage means comprises first and second support arms orthogonally oriented to one another and moveably connected so that said first support arm can move along the length of said second support arm, said first support arm being adapted to carry said photodetector means along its length, and controllable pivotal mounting means to which one end of said second control arm is attached whereby the orthogonal coordinates defined by said first and second support arms may be rotated.

4. Apparatus as set forth in claim 1 wherein said carriage means comprises electromechanical positioning means coupled to said photodetector means for moving said photodetector means over the surface of the opposite side of said translucent screen.

5. The apparatus for detecting the number of ridges between the core and delta of a fingerprint of claim 4 including counter means coupled to said photodetector means for registering the number of ridges encountered by said photodetector means when said photodetector means is moved in substantially a straight line between the core and delta of the projected fingerprint image.

6. The apparatus for detecting the number of ridges between the core and delta of a fingerprint of claim 1 including counter means coupled to said photodetector means for registering the number of ridges encountered by said photodetector means when said photodetector means is moved along said line.

7. The apparatus for detecting the number of ridges between the core and delta of a fingerprint of claim 5 including means coupled to said electromechanical positioning means for registering the position of said electromechanical means.

8. The apparatus for detecting the number of ridges between the core and delta of a fingerprint of claim 1 wherein said photodetector means comprises an elongated cylindrical housing tapering at one end to an aperture whereat a photodetector is positioned, said photodetector means having a photosensitive surface smaller than the width of the projected ridges of said fingerprint upon said translucent screen.

9. Apparatus for detecting the number of ridges between the core and delta of a fingerprint comprising:

a translucent optical projection screen;

means for optically projecting fingerprint images onto the surface of one side of said screen;

photodetector means situated on the opposite side of said translucent screen comprising an elongated cylindrical housing tapering at one end to an aperture whereat a photodetector is positioned and having a photosensitive surface smaller than the width of the projected ridges of said fingerprint upon said translucent screen;

means for guiding said photodetector means along a straight line within a plane parallel to the plane of said translucent screen; and mechanical linkage means for moving said guide means in mutually orthogonal directions within the plane of said guide means and pivotal means for angularly rotating said guide means within the plane of said guide means, whereby said photodetector means, being controllably positionable over the surface of the opposite side of said screen, responds to large changes of illumination intensity corresponding to ridges of the fingerprint by electrically producing output manifestations thereof.

10. Apparatus for detecting the number of ridges between the core and delta of a fingerprint comprising:

a translucent optical projection screen;

means for optically projecting fingerprint images onto the surface of one side of said screen;

photodetector means situated on the opposite side of said translucent screen;

means for guiding said photodetector means along a straight line parallel to the surface of the opposite side of said translucent screen, whereby said photodetector means, being controllably positionable over the surface of the opposite side of said screen, responds to large changes of illumination intensity corresponding to ridges of the fingerprint by electrically producing output manifestations thereof comprising: first drive means for traversing said guide means in a first direction, second drive means for traversing said guide means in a direction orthogonal to said first direction, third drive means for traversing said guide means in an angular direction within the plane of the traversals produced by said first and second drive means, means for detecting the position of said first, second and third drive means whereat said guide means is disposed at a location parallel to a straight line extending between the core and delta of said fingerprint;

counter means coupled to said photodetector means for registering the number of ridges encountered by said photodetector means when said photodetector means is moved in substantially a straight line between the core and delta of the projected fingerprint image;

information storage means; and gating means for passing said recorded first, second and third drive means positions and said ridge count to said storage.